M. E. REISERT.
COUNTING DEVICE OF AUTOMATIC WEIGHING APPARATUS FOR GRANULAR IRREGULARLY RUNNING MATERIAL.
APPLICATION FILED JAN. 6, 1913.
1,075,379.
Patented Oct. 14, 1913.
3 SHEETS—SHEET 1.
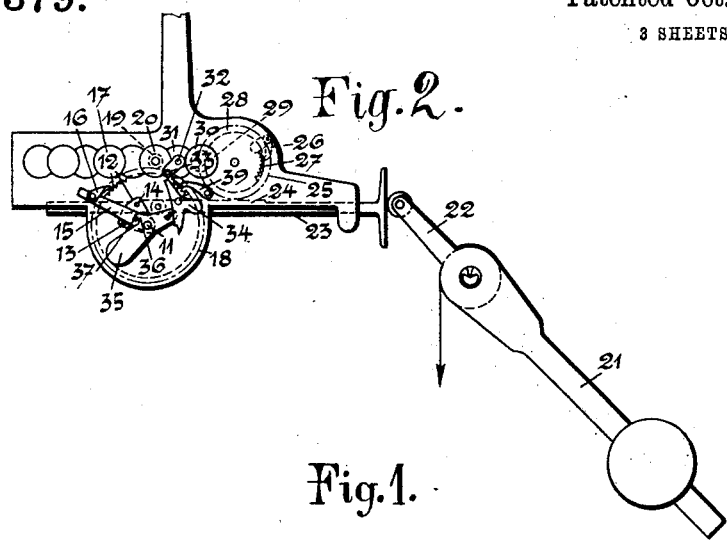
Fig. 2.
Fig. 1.
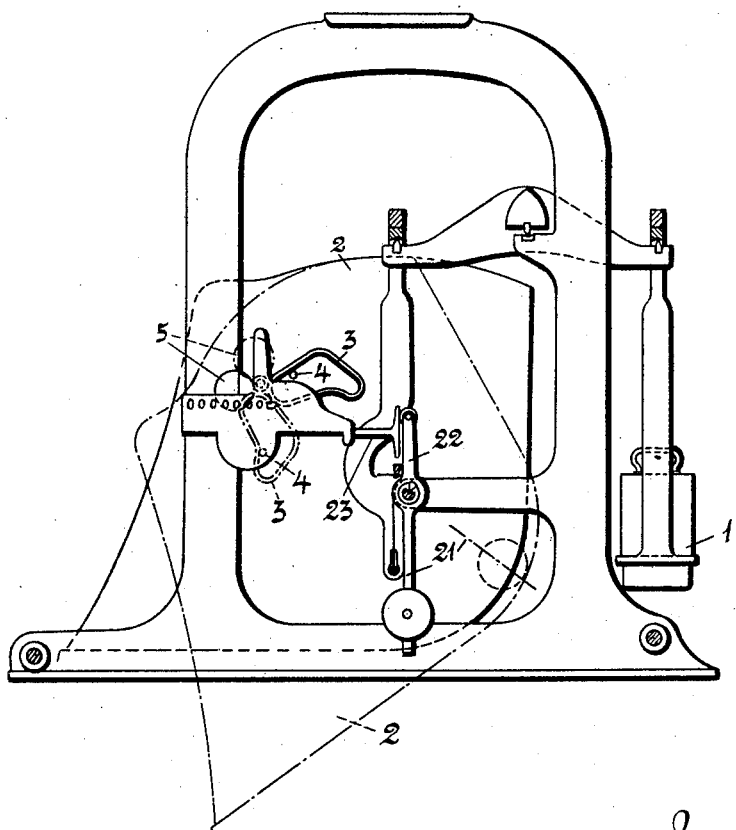
Witnesses:
P. V. Dommers.
E. Leckert.
Inventor.
Michael E. Reisert
By
Atty M. E. REISERT.
COUNTING DEVICE OF AUTOMATIC WEIGHING APPARATUS FOR GRANULAR IRREGULARLY RUNNING MATERIAL.
APPLICATION FILED JAN. 6, 1913.
1,075,379.
Patented Oct. 14, 1913.
3 SHEETS—SHEET 2.
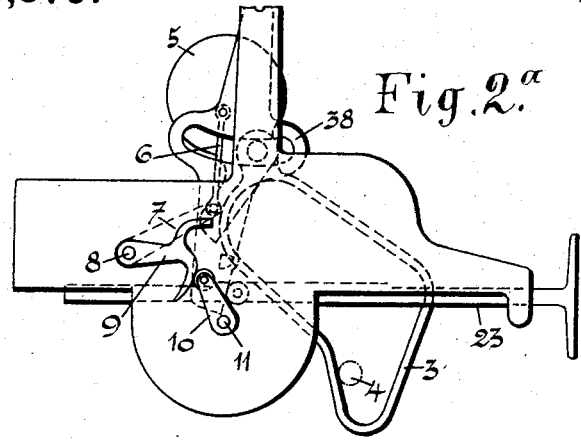
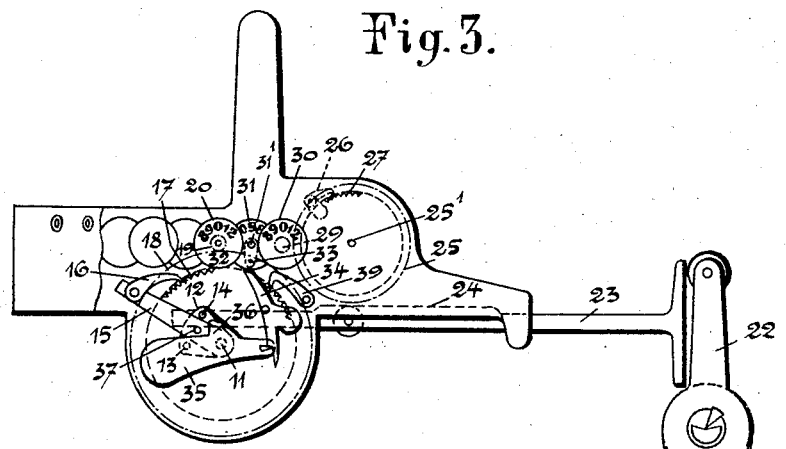
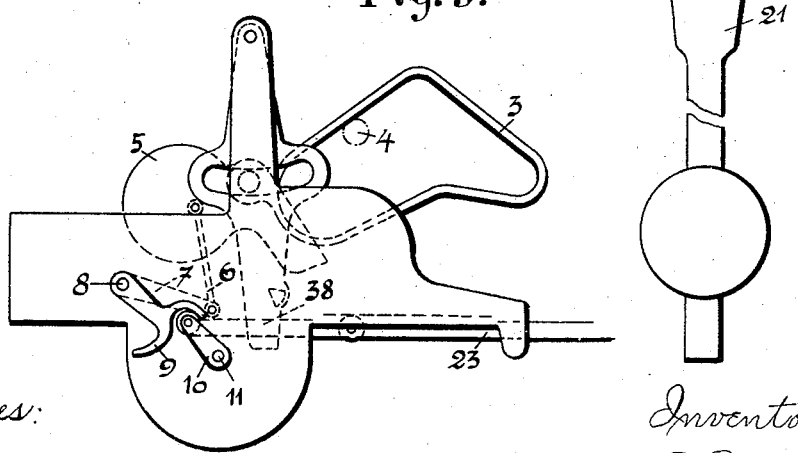

M. E. REISERT.
COUNTING DEVICE OF AUTOMATIC WEIGHING APPARATUS FOR GRANULAR IRREGULARLY RUNNING MATERIAL.
APPLICATION FILED JAN. 6, 1913.
1,075,379.
Patented Oct. 14, 1913.
3 SHEETS—SHEET 3.
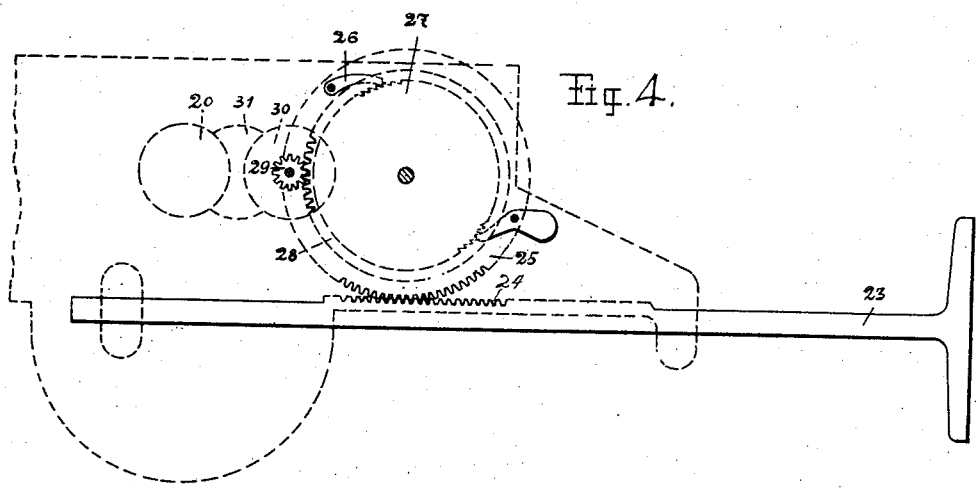
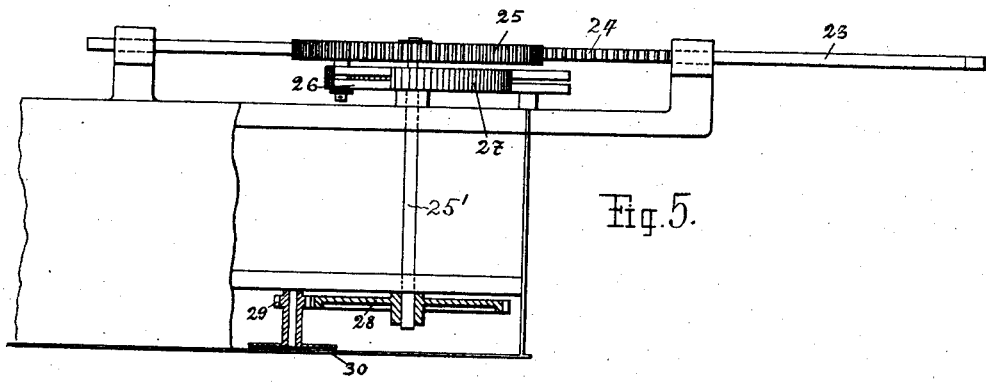

UNITED STATES PATENT OFFICE.

MICHAEL EDUARD REISERT, OF HENNEF-ON-THE-SIEG, GERMANY, ASSIGNOR TO THE FIRM OF HENNEFER MASCHINENFABRIK C. REUTHER & REISERT MIT BESCHRANKTER HAFTUNG, OF HENNEF-ON-THE-SIEG, GERMANY.

COUNTING DEVICE OF AUTOMATIC WEIGHING APPARATUS FOR GRANULAR IRREGULARLY-RUNNING MATERIAL.

1,075,379.  Specification of Letters Patent.  Patented Oct. 14, 1913.

Application filed January 6, 1913. Serial No. 740,475.

*To all whom it may concern:*

Be it known that I, MICHAEL EDUARD REISERT, a subject of the German Emperor, and resident of Hennef-on-the-Sieg, in the Province of Rhineland and Kingdom of Prussia, in the German Empire, have invented new and useful Improvements in Counting Devices of Automatic Weighing Apparatus for Granular Irregularly-Running Material, of which the following is a specification.

The present invention relates to automatic weighing apparatus for granular material such as coal, turnips, ore or the like, said apparatus being constructed in such manner, that each time the same minimum weight for instance 400 kilograms is registered and added by one counting device, the surplus weight over this minimum weight of each charge is registered and added by a second counting device.

In known apparatus the total weight of the material weighed each time, is ascertained by adding the two rows of numbers generally standing one below the other. By the present counting device the adding of the surplus weight to the sum of the minimum weight is carried on automatically. Thus the two counting devices are combined in one single counting device inasmuch as the dial has only one single row of numbers from which the total weight can be read off. The counting device is so constructed, that each time, the sum of the surplus weight, surpasses a certain number, for instance 100, the minimum counting device continues counting by adding this number 100. In this case, where the transfer to the hundreds disk takes place and the minimum charges of the load receptacle is 400 kg., the counting device counts in continuing 500 kg. instead of 400 kg. The operation of the counter of the minimum weights is derived from a ratchet wheel which is rotated step by step at each emptying of the weighing scale or receptacle for a number of teeth corresponding to the minimum weight, that is to say, for 4 teeth corresponding to 400 kg. as the minimum weight, and which wheel is rotated for one tooth more than usually when the sum of the surplus weights amounts to the predetermined number (100). This operation is arrived at by the fact that the surplus counter retracts the pawl which operates the ratchet wheel of the minimum weight counter for one tooth, as soon as the surplus counter arrives at the predetermined number (100), so that by the next operation of the ratchet wheel is rotated for one tooth more than usual.

A counting device of this description is well adapted for use in connection with automatic balances or weighing apparatus for any kind of material running irregularly.

In the accompanying drawing Figure 1 is a sectional elevation, of a weighing apparatus embodying my invention. Fig. 2 is an elevation of the counting device. Fig. 3 is a similar view of the device in a different position. Fig. 2ª and Fig. 3ª illustrate the mechanisms on the back of the device shown in Figs. 2 and 3. Fig. 4 is an enlarged detail side view of the means for transmitting movement to the units wheel, and Fig. 5 is a plan view partly in section, of the same.

If by way of example the weight-pan 1 is loaded with 400 kg. the receptacle 2 for the material will discharge at least 400 kg. at each turnover. As is well known a loop-shaped lever 3 of the counting device will be turned into a downward position by a stud 4 on the receptacle, when emptying or discharging, while it returns into the upright position together with the receptacle by the aid of a counter-weight 5. This lever 3 is connected with a lever 7 by a connecting-rod 6 and the lever 7 with a lever 9 by a shaft 8, Figs. 2ª and 3ª. When the receptacle filled with material is turned over a lever 9 operates the lever 10 and the latter acts on a shield 12 fixed on a shaft 11. The shield 12 is provided with two pins 13 and 14 between which an arm 15 projects loosely, mounted on the shaft 11 and provided with a pawl 16 engaging the teeth of a ratchet wheel 17. When the pin 13 has moved idly for a distance corresponding to the distance between two teeth of the wheel 17, it engages the arm 15, and in continuing the pawl 16 turns the wheel 17 for a distance of 4 teeth. By aid of the gearing 18, 19 the hundreds disk 20 of the counting device is rotated for 4 numerals which thus register 400 kg. on the dial. By the surplus weight added to the minimum weight the usual balance 21 is oscillated by means of a cord or steel band 21$^a$ one end of which is attached to the receptacle support 2$^a$ and the other end to a boss 21$^b$ on the balance 21, above the pivot point of the latter. Therefore, when the receptacle 2 is filled with material to exceed the weight of 400 kg., it will move down pulling on the cord or band 21$^a$ thus oscillating the balance so that the arm 22 of the latter engages a horizontal rod 23 which is slidably mounted in a fixed part of the apparatus. This slide rod is provided with rack teeth 24 by which it rotates a gear 25 journaled above the slide rod. The gear 25 is mounted loosely on a shaft 25′ and is provided with a pawl 26 engaging a ratchet wheel 27 which is fixed on the shaft 25′ which carries a gear 28. This gear 28 meshes with a pinion 29 connected with the units disk 30.

By these means on each movement of the slide rod 23 the units disk 30 will be rotated to such an angle, which corresponds to the amount of the surplus weight beyond the minimum weight (of 400 kg.) The disk 30 registers the units and the disk 31 registers the tens. The disk 31 is firmly connected with an arm 32 by its shaft 31′. When the disk 31 moves from 99 to 0 the arm 32 by means of pin 33 thereon releases a locking pawl 34 so that the counter weight 35 loosely arranged on the shaft 11 and provided with a nose 36 lying in the path of a pin 37, fastened to the arm 15 falls down and rotates the arm 15 by aid of the nose 36 acting on the pin 37 of the arm 15, to such an extent downward, that the pawl 16 is retracted over the ratchet wheel 17 for one tooth. Now when the receptacle is emptied the wheel 17 is not only turned for 4 teeth as usually but for 5 teeth and therefore the hundreds disk will not register 400 kg. but 500 kg., because the pin 13 has not moved any distance idly before it engages the lever 15. At the same time the wheel 17 is rotated, the pawl carrier 15 retracts the weighted lever 35 by means of the pin 37, until the lever 35 is caught by the locking pawl 34. When the receptacle for the material returns to its normal position, by the aid of the weight 5, the loop 5 and also the arm 15 carrying the pawl 16 is returned to its initial position. By the return movement of the receptacle 2 also the rod 23 carrying the rack 24 is shifted to its initial position by the loop 3 and by aid of the lever 38. The pawl 39, which engages the ratchet wheel 17 prevents the latter from turning backward, while the pawl 16 returns to its initial position.

I claim:

1. A counting device for use in automatic weighing apparatus for granular material moving irregularly, comprising a train of number carrying disks, the disks for the lower numbers (say units and tens) adapted to move independently from the rest of the number disks, a ratchet mechanism adapted to rotate the number disks of higher denomination, means to rotate the disks for the lower numbers and means to increase the throw of the said ratchet mechanism, when the disks of the lower denomination move beyond a predetermined position.

2. A counting device for use in automatic weighing apparatus for granular material moving irregularly, comprising a train of number carrying disks, the disks for the lower numbers (say units and tens) adapted to move independently from the rest of the number disks, a ratchet mechanism adapted to rotate the number disks of higher denomination, and a second ratchet mechanism adapted to rotate the number disks of lower denomination and means to increase the throw of the first named ratchet mechanism, when the disks of the lower denomination move beyond a predetermined position.

3. A counting device for use in automatic weighing apparatus for granular material moving irregularly, comprising a train of number carrying disks, the disks for the lower numbers (say units and tens) adapted to move independently from the rest of the number disks, a ratchet mechanism adapted to rotate the number disks of higher denomination, a weighted lever pivoted to a fixed part of the apparatus, a pin on the receptacle constituting the balance scale, the pin being adapted to rotate the weighted lever on the descent of the receptacle, means connected with the weighted lever to operate the ratchet mechanism, when the receptacle descends, means to rotate the disks for the lower numbers and means to increase the throw of the said ratchet mechanism, when the disks of the lower denomination move beyond a predetermined position.

4. A counting device for use in automatic weighing apparatus for granular material moving irregularly, comprising a train of number carrying disks, the disks for the lower numbers (say units and tens) adapted to move independently from the rest of the number disks, a ratchet mechanism adapted to rotate the number disks of higher denomination, a weighted lever pivoted to a fixed part of the apparatus, a pin on the receptacle constituting the balance scale, the pin being adapted to rotate the weighted lever on the descent of the receptacle, means connected with the weighted lever to operate the ratchet mechanism, when the receptacle descends, a second ratchet mechanism adapted to rotate the disks for the lower numbers, means to increase the throw of the first named ratchet mechanism, when the disks of the lower denomination move beyond a predetermined position.

5. A counting device for use in automatic weighing apparatus for granular material moving irregularly, comprising a train of number carrying disks, the disks for the lower numbers (say units and tens) adapted to move independently from the rest of the number disks, a ratchet wheel adapted to rotate the number disks of the higher denomination, a pawl adapted to engage the teeth of the ratchet wheel, means adapted to operate the pawl and means to change the throw of the means operating the pawl, these changeable means being adapted to be locked in position and to be released, when the number disks of lower denomination move beyond a predetermined position.

6. A counting device for use in automatic weighing apparatus for granular material moving irregularly, comprising a train of number carrying disks, the disks for the lower numbers (say units and tens) adapted to move independently from the rest of the number disks, a ratchet wheel adapted to rotate the number disks of the higher denomination, a pawl adapted to engage the teeth of the ratchet wheel, an arm rotatable about the axis of the ratchet wheel and carrying the pawl, a shield also rotatable about the axis of the ratchet wheel, two pins on the shield, the pawl carrying arm projecting between the two pins, one pin adapted to retract the said arm and the other pin adapted to move the arm forward to operate the ratchet wheel, the distance of the pins being of such size to normally allow the shield to move idly before it operates the said arm on its return movement, means independent from this operating mechanism to increase the backward movement of the pawl, when the number disks of lower denomination move beyond a predetermined position.

7. A counting device for automatic weighing apparatus comprising a train of number wheels, means to operate those of lower denomination and means to operate the number wheels of higher denomination independently, a weighted lever adapted to be moved by the means to operate the high numbered wheels, means to lock the said weighted lever and adapted to be released by the number wheels of lower denomination.

8. A counting device for weighing apparatus comprising a train of numbering wheels, two ratchet mechanisms, one to operate the number wheels of higher denomination and one adapted to operate the wheels of the lower denomination, a weighted lever adapted to be locked in a raised position, a locking lever for the said weighted lever and adapted to be released by the number wheels of lower denomination, a nose on the weighted lever adapted to increase the throw of the ratchet mechanism for operating the number wheels of the higher denomination.

9. A counting device for weighing apparatus comprising a train of numbering wheels, two ratchet mechanisms, one to operate the number wheels of higher denomination and one adapted to operate the wheels of the lower denomination, a weighted lever adapted to be locked in a raised position, a locking lever for the said weighted lever and adapted to be released by the number wheels of lower denomination, a nose on the weighted lever adapted to increase the throw of the ratchet mechanism for operating the number wheels of the higher denomination, a rack adapted to operate the second ratchet mechanism, a balance adapted to be oscillated by the surplus weight of the weighing apparatus and to move the rack for operating the number disks of lower denomination.

MICHAEL EDUARD REISERT.

Witnesses:
LOUIS VANDORY,
R. G. HOPPER.

---

Copies of this patent may be obtained for five cents each, by addressing the "Commissioner of Patents Washington, D. C."